(12) United States Patent
Zhang

(10) Patent No.: US 10,706,590 B2
(45) Date of Patent: Jul. 7, 2020

(54) SUBTITLE BEAT GENERATION METHOD, IMAGE PROCESSING METHOD, TERMINAL, AND SERVER

(71) Applicant: TENCENT TECHNOLOGY (SHENZHEN) COMPANY LIMITED, Shenzhen (CN)

(72) Inventor: Zijun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 26 days.

(21) Appl. No.: 16/105,855

(22) Filed: Aug. 20, 2018

(65) Prior Publication Data

US 2018/0365865 A1 Dec. 20, 2018

Related U.S. Application Data

(63) Continuation of application No. PCT/CN2017/074755, filed on Feb. 24, 2017.

(30) Foreign Application Priority Data

Feb. 26, 2016 (CN) .......................... 2016 1 0109368

(51) Int. Cl.
*G06T 11/00* (2006.01)
*G06T 11/60* (2006.01)
*H04W 4/021* (2018.01)
*H04N 5/278* (2006.01)
*H04L 29/08* (2006.01)

(52) U.S. Cl.
CPC ............ *G06T 11/001* (2013.01); *G06T 11/60* (2013.01); *H04L 67/18* (2013.01); *H04N 5/278* (2013.01); *H04W 4/021* (2013.01)

(58) Field of Classification Search
None
See application file for complete search history.

(56) References Cited

U.S. PATENT DOCUMENTS

2015/0127405 A1* 5/2015 Peeler ................ G06Q 10/1095
705/7.19
2017/0118383 A1* 4/2017 Bollman .............. H04N 5/2224

FOREIGN PATENT DOCUMENTS

| CN | 1497968 A | 5/2004 |
|---|---|---|
| CN | 103166945 A | 6/2013 |

(Continued)

OTHER PUBLICATIONS

The State Intellectual Property Office of the People's Republic of China (SIPO) Office Action 1 for 201610109368.0 dated Jun. 27, 2019 10 Pages. (including translation).

(Continued)

*Primary Examiner* — Michelle Chin
(74) *Attorney, Agent, or Firm* — Anova Law Group, PLLC

(57) ABSTRACT

A subtitle beat generation method includes: obtaining a current geographic location of a terminal; uploading the current geographic location of the terminal to a server; receiving candidate filter effects and candidate subtitles, obtained by the server according to the current geographic location of the terminal; obtaining a filter effect and a subtitle, selected from the candidate filter effects and the candidate subtitles; and forming a subtitle beat according to the selected filter effect and the selected subtitle, and outputting the subtitle beat.

17 Claims, 7 Drawing Sheets

(56) References Cited

FOREIGN PATENT DOCUMENTS

| | | |
|---|---|---|
| CN | 103533241 A | 1/2014 |
| CN | 103544159 A | 1/2014 |
| CN | 104486558 A | 4/2015 |
| CN | 104867097 A | 8/2015 |
| CN | 104915417 A | 9/2015 |
| CN | 105303591 A | 2/2016 |

OTHER PUBLICATIONS

The State Intellectual Property Office of the People's Republic of China (SIPO) Office Action 1 for 201610109368.0 dated Mar. 15, 2019 10 Pages (including translation).
The World Intellectual Property Organization (WIPO) International Search Report for PCT/CN2017/074755 dated May 12, 2017 5 Pages (including translation).

* cited by examiner

SUBTITLE BEAT GENERATION METHOD, IMAGE PROCESSING METHOD, TERMINAL, AND SERVER

RELATED APPLICATIONS

This application is a continuation application of PCT Patent Application No. PCT/CN2017/074755, filed on Feb. 24, 2017, which claims priority to Chinese Patent Application No. 201610109368.0, filed with the Chinese Patent Office on Feb. 26, 2016, and entitled "SUBTITLE BEAT GENERATION METHOD AND APPARATUS, AND IMAGE PROCESSING METHOD AND APPARATUS", all of which is incorporated herein by reference in their entirety.

FIELD OF THE TECHNOLOGY

The present disclosure relates to the field of image processing, and in particular, to a subtitle beat generation method, an image processing method, a terminal, and a server.

BACKGROUND OF THE DISCLOSURE

With the development of mobile terminals, a user often uses a mobile terminal for photographing various images. To improve an effect of an image, a subtitle beat is superimposed on the photographed image. The subtitle beat includes a filter effect and a subtitle. A style of the subtitle is set in a form of a movie subtitle and a filter effect like a filmstrip is superimposed on the image, so that the image is artistic, and is similar to a frame of a picture in a movie.

In a conventional image processing method, some combinations of filter effects and subtitles are built in an application program, the application program is locally downloaded, and a user chooses to use a filter effect and a subtitle in a combination. However, there are a limited quantity of built-in combinations of filter effects and subtitles, and there are few styles for a subtitle beat.

SUMMARY

According to embodiments of this application, a subtitle beat generation method, an image processing method, a terminal, and a server are provided.

One aspect of the present disclosure provides a subtitle beat generation method, including:
  obtaining a current geographic location of a terminal;
  uploading the current geographic location of the terminal to a server;
  receiving candidate filter effects and candidate subtitles, provided by the server according to the current geographic location of the terminal;
  obtaining a filter effect and a subtitle, selected from the candidate filter effects and the candidate subtitles; and
  forming a subtitle beat according to the selected filter effect and the selected subtitle, and outputting the subtitle beat.

Another aspect of the present disclosure provides a terminal, including a memory configured to store computer-readable instructions and a processor coupled to the memory and when the computer-readable instructions being executed, configured to:
  obtain a current geographic location of the terminal;
  upload the current geographic location of the terminal to a server;
  receive candidate filter effects and candidate subtitles, provided by the server according to the current geographic location of the terminal;
  obtain a filter effect and a subtitle, selected from the candidate filter effects and the candidate subtitles; and
  forming a subtitle beat according to the selected filter effect and the selected subtitle, and outputting the subtitle beat.

Another aspect of the present disclosure provides non-transitory computer-readable storage medium containing computer-executable program instructions for a processor to:
  obtain a current geographic location of a terminal;
  upload the current geographic location of the terminal to a server;
  receive candidate filter effects and candidate subtitles, provided by the server according to the current geographic location of the terminal;
  obtain a filter effect and a subtitle, selected from the candidate filter effects and the candidate subtitles; and
  form a subtitle beat according to the selected filter effect and the selected subtitle, and outputting the subtitle beat.

Another aspect of the present disclosure provides a subtitle beat generation method including:
  receiving a current geographic location of a terminal;
  obtaining candidate filter effects and subtitles according to the current geographic location of the terminal; and
  sending the candidate filter effects and subtitles to the terminal, so that the terminal obtains a filter effect and a subtitle that are selected from the candidate filter effects and the candidate subtitles, forms a subtitle beat according to the selected filter effect and the selected subtitle, and outputs the subtitle beat.

Another aspect of the present disclosure provides a server, including a memory configured to store computer-readable instructions, and a processor coupled to the memory and, when computer-readable instructions being executed, configured to:
  receive a current geographic location of a terminal;
  obtain candidate filter effects and candidate subtitles according to the current geographic location of the terminal; and
  send the candidate filter effects and the candidate subtitles to the terminal, so that the terminal obtains a filter effect and a subtitle, selected from the candidate filter effects and the candidate subtitles, forms a subtitle beat according to the selected filter effect and the selected subtitle, and outputs the subtitle beat.

Another aspect of the present disclosure provides an image processing method, including:
  obtaining a current geographic location of a terminal;
  uploading the current geographic location of the terminal to a server;
  receiving candidate filter effects and candidate subtitles, provided by the server according to the current geographic location of the terminal;
  obtaining a filter effect and a subtitle, selected from the candidate filter effects and the candidate subtitles;
  forming a subtitle beat according to the selected filter effect and the selected subtitle, and outputting the subtitle beat;
  obtaining an image; and
  adding the subtitle beat to the image.

Another aspect of the present disclosure provides a terminal, including: a memory configured to store computer-readable instructions and a processor coupled to the memory and when the computer-readable instructions being executed, configured to:

obtain a current geographic location of a terminal;

upload the current geographic location of the terminal to a server;

receive candidate filter effects and candidate subtitles, obtained by the server according to the current geographic location of the terminal;

obtain a filter effect and a subtitle, selected from the candidate filter effects and the candidate subtitles;

form a subtitle beat according to the selected filter effect and the selected subtitle, and outputting the subtitle beat;

obtaining an image; and adding the subtitle beat to the image.

Another aspect of the present disclosure provides a non-transitory computer-readable storage medium containing computer-executable program instructions for a processor to:

receive a current geographic location of a terminal;

obtain candidate filter effects and candidate subtitles according to the current geographic location of the terminal; and sending the candidate filter effects and the candidate subtitles to the terminal, so that the terminal obtains a filter effect and a subtitle, selected from the candidate filter effects and the candidate subtitles, forms a subtitle beat according to the selected filter effect and the selected subtitle, and outputs the subtitle beat.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
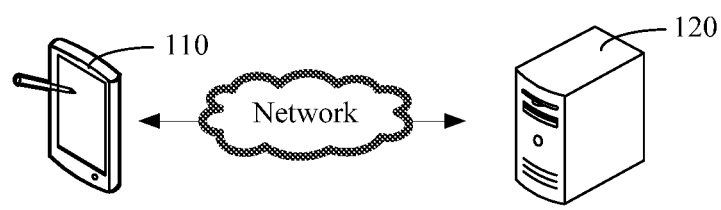
FIG. 1 is a schematic diagram of an application environment of a subtitle beat generation method and an image processing method according to an exemplary embodiment of the present disclosure.

FIG. 1 is a schematic diagram of an application environment of a subtitle beat generation method and an image processing method according to an exemplary embodiment of the present disclosure.

As shown in FIG. 1, the application environment includes a terminal 110 and a server 120. The terminal 110 communicates with the server 120 using a network. The terminal 110 obtains a geographic location of the terminal, and uploads the geographic location of the terminal to the server 120. The server 120 obtains corresponding candidate filter effects and subtitles according to the geographic location of the terminal, and sends the candidate filter effects and the candidate subtitles to the terminal 110. The terminal 110 displays the candidate filter effects and subtitles, obtains a filter effect and a subtitle that are selected by a user from the candidate filter effects and subtitles, and outputs the selected filter effect and subtitle.

Filter effects are used to implement various special effects of an image. A filter may be an antimatter filter (implementing brightness inversion without affecting chrominance and saturation), a bevel emboss filter (which can produce a trellised slope and a carving appearance, and covert them into a bevel emboss effect), a corona filter (which can produce a celestial effect such as a corona, an airflow, and a cloud cluster), a cut-out filter (by applying a shadow effect, causing an image to have an effect similar to a cavity or a bump), a drip effect (which can add various vivid drip effects to a text and an image), a fire filter (which can generate various different flames and an effect similar to a flame), a fur filter (which can produce fur and hair of various different shapes and colors and another effect), a glass filter (producing a glass effect by means of simulated refraction, filtering, or reflection), a gradient glow filter (producing a real glow and a gradient color effect around an object), a noise filter (adding different noise effects to an image by adjusting a hue, saturation, and brightness), a jiggle filter (producing a strong distortion and deformation effect), a shadow filter (which can add multiple shadow effects to an object), a smoke filter (which can produce various natural smoke effects), a squint filter (which can produce a blur effect), a star filter (which can produce various star effects), a swirl filter (producing a swirl effect), a water drop filter (which can produce water drop effects of various colors and shapes), a weave filter (producing a weave effect), a wood filter (producing various vivid wood effects), and/or the like.

Figure 2A:
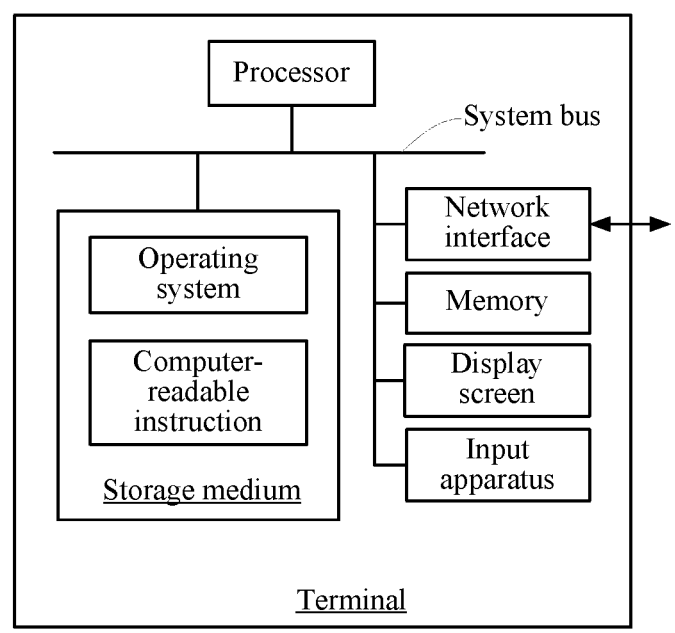
FIG. 2A is a schematic diagram of an internal structure of a terminal according to an exemplary embodiment of the present disclosure.

FIG. 2A is a schematic diagram of an exemplary internal structure of a terminal 110 according to an exemplary embodiment.

As shown in FIG. 2A, the terminal 110 includes a processor, a storage medium, a memory, a network interface, a display screen, and an input apparatus that are connected by using a system bus.

The storage medium of the terminal stores an operating system and a computer-readable instruction. When the computer-readable instruction is executed by the processor, a subtitle beat generation method is implemented. The processor is configured to provide computing and control capabilities to support running of the entire terminal. The memory in the terminal provides an environment for running of the computer-readable instruction in the storage medium. The network interface is configured to communicate with a server by using a network, for example, send a geographic location to the server, and receive a filter effect and a subtitle that are returned by the server. The display screen of the terminal may be a liquid crystal display screen, an e-ink display screen, or the like. The input apparatus may be a touch layer covering the display screen, or may be a key, a track ball, or a touchpad disposed on a housing of the terminal, or may be an external keyboard, touchpad, or mouse.

The terminal may be a mobile phone, a tablet computer, a personal digital assistant, a wearable device, or the like. A person skilled in the art may understand that, although FIG. 2A shows a block diagram of a partial structure of the exemplary terminal, any suitable elements may be further included in the disclosed terminal without limitation. For example, the terminal may include more components or fewer components than those shown in the figure, or some components may be combined, or a different component deployment may be used.

Figure 2B:
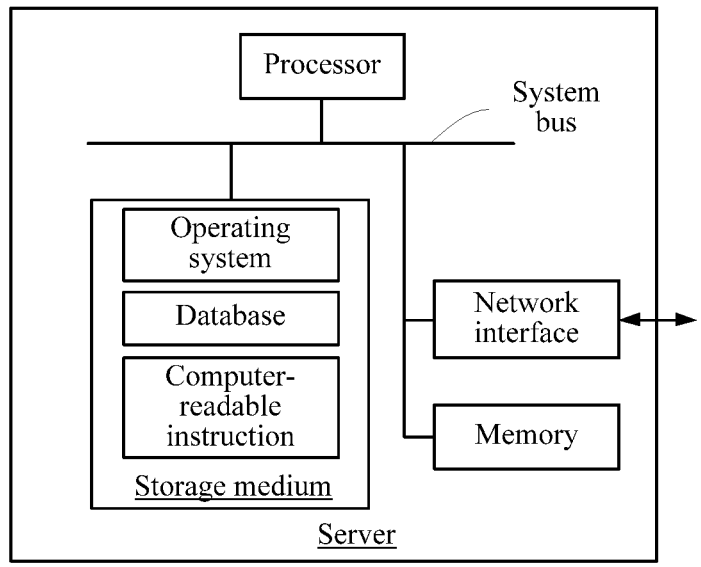
FIG. 2B is a schematic diagram of an internal structure of a server according to an exemplary embodiment of the present disclosure.

FIG. 2B is a schematic diagram of the internal structure of a server according to an exemplary embodiment of the present disclosure. As shown in FIG. 2B, the server 120 includes a processor, a storage medium, a memory, and a network interface that are connected by using a system bus. The storage medium of the server stores an operating system, a database, and a computer-readable instruction. The database stores a geographic location and a corresponding filter effect and subtitle. When the computer-readable instruction is executed by the processor, a subtitle beat generation method applicable to the server is implemented. The processor of the server is configured to provide computing and control capabilities to support running of the entire server. The memory in the server provides an environment for running of the computer-readable instruction in the storage medium. The network interface of the server is configured to connect to and communicate with an external terminal by using a network, for example, receive a geographic location sent by the terminal, and return a filter effect and a subtitle to the terminal. The server may be an independent server or implemented by using a server cluster including multiple servers. A person skilled in the art may understand that, in the structure shown in FIG. 2B, only a block diagram of a partial structure related to a solution in this application is shown, and does not constitute a limit to the server to which the solution in this application is applied. For example, the server may include more components or fewer components than those shown in the figure, or some components may be combined, or a different component deployment may be used.

Figure 3:
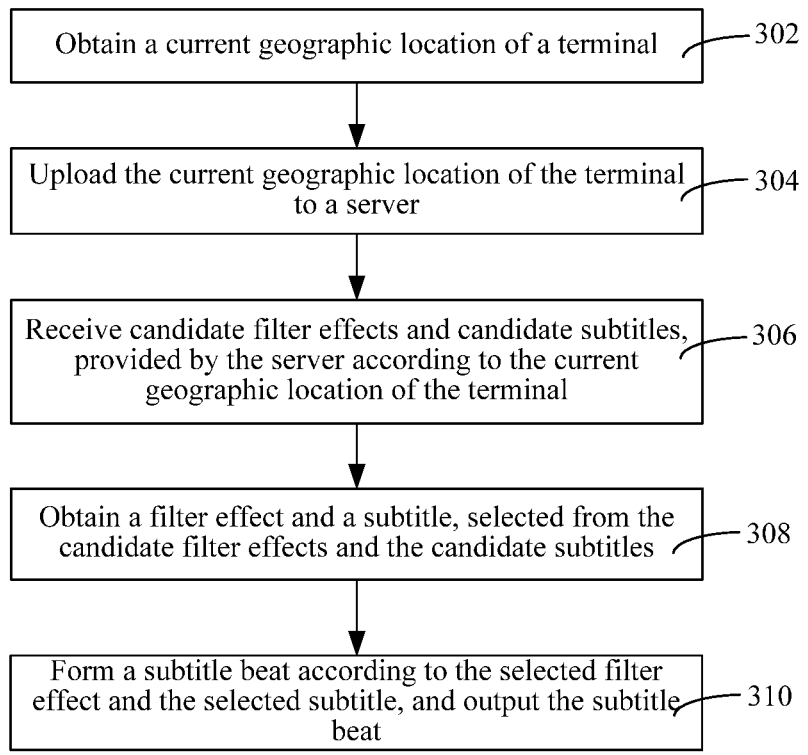
FIG. 3 is a flowchart of a subtitle beat generation method according to an exemplary embodiment of the present disclosure.

FIG. 3 is a flowchart of a subtitle beat generation method according to an exemplary embodiment. As shown in FIG. 3, the subtitle beat generation method is run on the terminal in FIG. 1, and includes the following steps:

In 302: Obtaining a current geographic location of the terminal.

In an exemplary embodiment, the terminal positions the current geographic location by using a Globe Positioning System (GPS), a BeiDou Navigation Satellite System, or the like.

In 304: Uploading the current geographic location of the terminal to a server.

In an exemplary embodiment, the terminal obtains a latitude and longitude from the current geographic location, and uploads the latitude and longitude to the server.

In 306: Receiving corresponding candidate filter effects and subtitles, obtained by the server according to the current geographic location of the terminal.

In an exemplary embodiment, the server obtains the corresponding candidate filter effects and subtitles according to the current geographic location of the terminal, and sends the candidate filter effects and the candidate subtitles to the terminal.

A mapping relationship between a geographic location and a filter effect and a mapping relationship between a geographic location and a subtitle are pre-established in the server. The geographic location of the terminal is obtained, and one or more corresponding filter effects are found from the mapping relationship between a geographic location and a filter effects according to the geographic location of the terminal, as the candidate filter effects. One or more corresponding subtitles are found from the mapping relationship between a geographic location and a subtitle according to the geographic location of the terminal, as the candidate subtitles. Content of the subtitle may be one or two of a hot event and a historical event at the geographic location.

In 308: Obtaining a filter effect and a subtitle that are selected from the candidate filter effects and subtitles.

In an exemplary embodiment, the candidate filter effects and the candidate subtitles are displayed on the terminal, the filter effect selected by a user from the candidate filter effects is obtained, and the subtitle selected by the user from the candidate subtitles is obtained.

In 310: Forming a subtitle beat according to the selected filter effect and subtitle, and output the subtitle beat.

In an exemplary embodiment, for the output subtitle beat, the selected subtitle beat may be displayed in a preview manner, that is, the filter effect and the subtitle are displayed.

According to the disclosed subtitle beat generation method, a current geographic location of a terminal is obtained; the current geographic location is uploaded to a server; the server obtains corresponding candidate filter effects and subtitles according to the current geographic location of the terminal, and sends the corresponding candidate filter effects and subtitles to the terminal; and the terminal obtains a filter effect and a subtitle that are selected from the candidate filter effects and the candidate subtitles, and forms a subtitle beat. Because any filter effect and subtitle can be selected from the candidate filter effects and subtitles to form a subtitle beat, the formed subtitle beat is diversified, and the subtitle beat does not need to be stored in the terminal, thereby saving storage space of the terminal.

In an exemplary embodiment, receiving the candidate filter effects and subtitles, obtained by the server according to the current geographic location of the terminal includes: receiving a hot event and/or a historical event, obtained by the server, from a pre-established mapping relationship between a geographic location and a hot event along with a historical event according to the current geographic location of the terminal, and using the one or more of the hot events and/or the historical events as the candidate subtitles corresponding to the current geographic location of the terminal.

In an exemplary embodiment, the mapping relationship between a geographic location and a hot event may be pre-established, and the mapping relationship between a geographic location and a historical event may be pre-established. A hot event is an event currently more concerned and interested by people.

By using a hot event or a historical event as a subtitle, on a trip, the user can photograph an image with sharable value based on a current hot event or a historical event.

In an exemplary embodiment, the subtitle beat generation method further includes: when the server does not obtain or is otherwise unable to obtain the corresponding candidate filter effects and subtitles according to the current geographic location of the terminal, receiving a default filter effect and subtitle that are obtained by the server according to the current geographic location of the terminal; and forming a subtitle beat according to the default filter effect and subtitle.

In an exemplary embodiment, the subtitle beat generation method further includes: obtaining the selected filter effect and subtitle, and uploading the selected filter effect and subtitle.

Receiving the candidate filter effects and subtitles, provided by the server according to the current geographic location of the terminal includes: receiving the corresponding candidate filter effects obtained by the server and sorted based on a usage count thereof, and receiving the corresponding candidate subtitles obtained by the server and sorted based on a usage count thereof, according to the current geographic location of the terminal.

For example, the server counts the usage count of filter effects, such as the number of times that the filter effects are used, and the usage count of subtitles, such as the number of times that the subtitles are used, sorts the filter effects according to the usage count of filter effects, and sorts the subtitles according to the usage count of subtitles. For example, the server may sort the filter effects in descending order or in ascending order according to the usage count of the filter effects, e.g., the number of times that the filter effects are used.

The filter effects are sorted, and a filter effect that is most frequently used may be recommended to the user, to facilitate selection by the user. The subtitles are sorted, and a subtitle that is most frequently used may be recommended to the user, to facilitate selection of a subtitle by the user.

In an exemplary embodiment, the subtitle beat generation method further includes: obtaining a subtitle edited by a user and a filter effect selected by the user, and forming the subtitle beat according to the subtitle edited by the user and the filter effect selected by the user.

The subtitle edited by the user is obtained, so that a personalized subtitle can be formed, to form a personalized subtitle beat.

Figure 4:
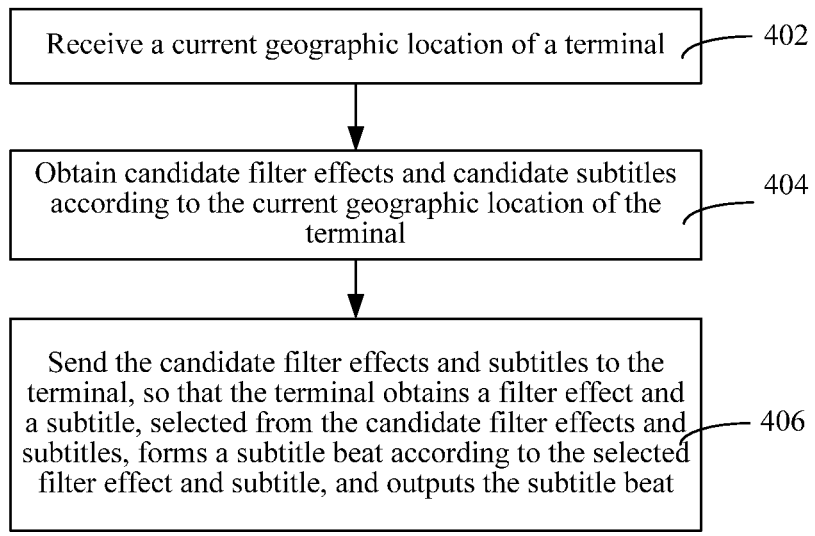
FIG. 4 is a flowchart of a subtitle beat generation method according to another exemplary embodiment of the present disclosure.

FIG. 4 is a flowchart of a subtitle beat generation method according to another exemplary embodiment of the present disclosure. As shown in FIG. 4, the subtitle beat generation method is run on a server, and includes the following exemplary steps:

In 402: Receiving a current geographic location of a terminal.

For example, the server receives the current geographic location uploaded by the terminal.

In 404: Obtaining candidate filter effects and subtitles according to the current geographic location of the terminal.

In an exemplary embodiment, the server obtains the corresponding candidate filter effects and subtitles according to the current geographic location of the terminal, and sends the candidate filter effects and the candidate subtitles to the terminal.

A mapping relationship between a geographic location and a filter effect and a mapping relationship between a geographic location and a subtitle are pre-established in the server. The geographic location of the terminal is obtained, and one or more corresponding filter effects are found from the mapping relationship between a geographic location and a filter effect according to the geographic location of the terminal, as the candidate filter effects. One or more corresponding subtitles are found from the mapping relationship between a geographic location and a subtitle according to the geographic location of the terminal, as the candidate subtitles. Content of the subtitles may be one or more of a hot event and a historical event at the geographic location.

A filter may be an antimatter filter (implementing brightness inversion without affecting chrominance and saturation), a bevel emboss filter (which can produce a trellised slope and a carving appearance, and covert them into a bevel emboss effect), a corona filter (which can produce a celestial effect such as a corona, an airflow, and a cloud cluster), a cut-out filter (by applying a shadow effect, causing an image to have an effect similar to a cavity or a bump), a drip effect (which can add various vivid drip effects to a text and an image), a fire filter (which can generate various different flames and an effect similar to a flame), a fur filter (which can produce fur and hair of various different shapes and colors and another effect), a glass filter (producing a glass effect by means of simulated refraction, filtering, or reflection), a gradient glow filter (producing a real glow and a gradient color effect around an object), a noise filter (adding different noise effects to an image by adjusting a hue, saturation, and brightness), a jiggle filter (producing a strong distortion and deformation effect), a shadow filter (which can add multiple shadow effects to an object), a smoke filter (which can produce various natural smoke effects), a squint filter (which can produce a blur effect), a star filter (which can produce various star effects), a swirl filter (producing a swirl effect), a water drop filter (which can produce water drop effects of various colors and shapes), a weave filter (producing a weave effect), a wood filter (producing various vivid wood effects), and/or the like.

A filter algorithm for a grayscale effect may be a maximum method, an average method, and a weighted average method. The maximum method is a new color value R (red)=G (green)=B (blue)=Max(R, G, B). The average method is a new color value R=G=B=(R+G+B)/3. The weighted average method is a new color value R=G=B= (R*Wr+G*Wg+B*Wb), where Wr, Wg, and Wb are weighted values of three color values.

A filter algorithm for a bevel emboss effect may use a result of an RGB value of a neighboring point minus an RGB value of a current point plus 128, as a new RGB value.

A filter algorithm for a softening effect is to set a color value of each pixel of an image to an average value of RGB values of surrounding eight points and the pixel.

In 406: Sending the candidate filter effects and subtitles to the terminal, so that the terminal obtains a filter effect and a subtitle that are selected from the candidate filter effects and subtitles, forms a subtitle beat according to the selected filter effect and the selected subtitle, and outputs the subtitle beat.

According to the disclosed subtitle beat generation method, a current geographic location of a terminal is obtained; and corresponding candidate filter effects and subtitles are obtained according to the current geographic location of the terminal and are sent to the terminal, so that the terminal obtains a filter effect and a subtitle that are selected from the candidate filter effects and the candidate subtitles, and forms a subtitle beat.

Because any filter effect and subtitle can be selected from the candidate filter effects and the candidate subtitles to form a subtitle beat, the formed subtitle beat is diversified, and the subtitle beat does not need to be stored in the terminal, thereby saving storage space of the terminal. An image has higher ornamental value by adding a filter effect to the image.

In an exemplary embodiment, the exemplary step 404 includes: obtaining a combination of a candidate filter effect and subtitle according to the current geographic location of the terminal.

In 406 includes: sending the combination of a candidate filter effect and subtitle to the terminal, so that the terminal obtains a combination of a filter effect and a subtitle that is selected from the combination of a candidate filter effect and subtitle, forms a subtitle beat according to the selected combination of a filter effect and a subtitle, and outputs the subtitle beat.

A combination of a filter effect and a subtitle is directly provided, to facilitate the user to directly select a combination to form a subtitle beat. An operation is simplified and convenient.

In an exemplary embodiment, the subtitle beat generation method further includes: obtaining the geographic location and a corresponding hot event (and/or historical event); and establishing a mapping relationship between a geographic location and a hot event (and/or a historical event).

The exemplary step of obtaining corresponding candidate filter effects and subtitles according to the current geographic location of the terminal includes:

obtaining one or more of a hot event and/or a historical event from the mapping relationship between a geographic location and a hot event (and/or a historical event) according to the current geographic location of the terminal, and using the one or more of the hot event and/or the historical event as the candidate subtitles corresponding to the current geographic location of the terminal.

In an exemplary embodiment, the subtitle beat generation method further includes: when the corresponding candidate filter effects and subtitles are not obtained or otherwise unable to obtain, according to the current geographic location of the terminal, obtaining a default filter effect and subtitle according to the current geographic location of the terminal; and sending the default filter effect and the default subtitle to the terminal.

In an exemplary embodiment, the subtitle beat generation method further includes: receiving the selected filter effect and subtitle that are uploaded by the terminal; counting the numbers of times that filter effects are used and the numbers of times that subtitles are used; and sorting the filter effects according to the numbers of times that the filter effects are used, and sorting the subtitles according to the numbers of times that the subtitles are used.

In an exemplary embodiment, the numbers of times that all filter effects are used and the numbers of times that all subtitles are used are counted, the filter effects are sorted according to the numbers of times that the filter effects are used, and the subtitles are sorted according to the numbers of times that the subtitles are used.

Figure 5:
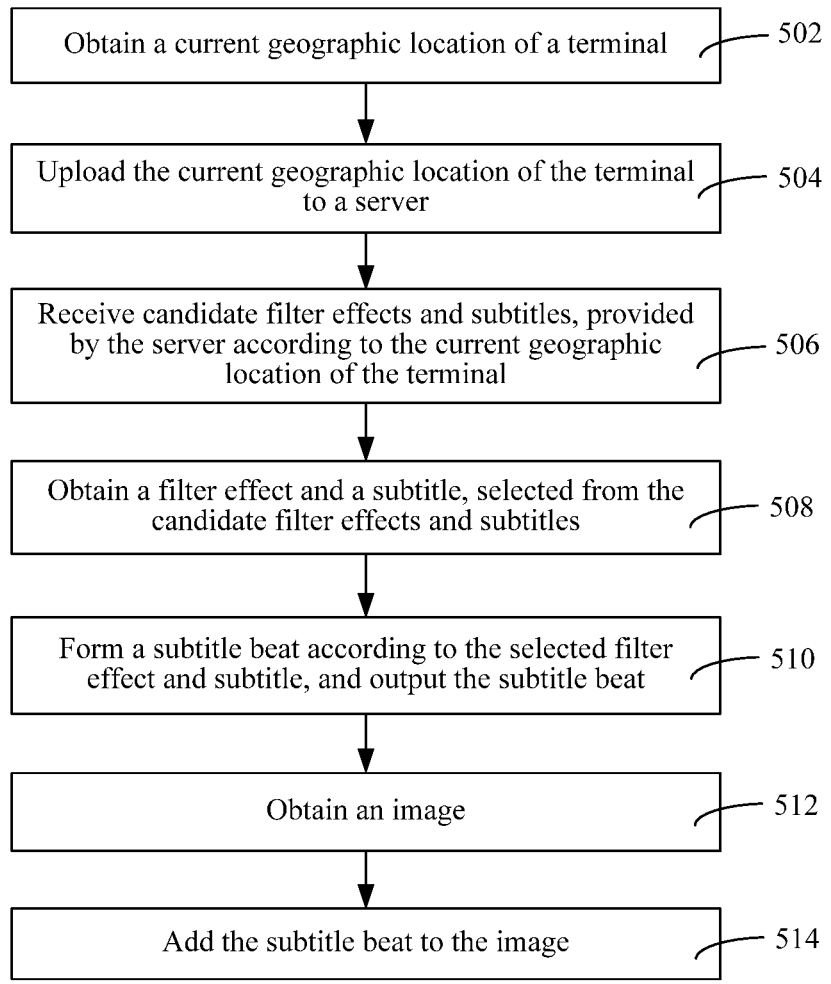
FIG. 5 is a flowchart of an image processing method according to an exemplary embodiment of the present disclosure.

FIG. 5 is a flowchart of an image processing method according to an exemplary embodiment of the present disclosure. As shown in FIG. 5, the image processing method includes the following exemplary steps:

In 502: Obtaining a current geographic location of a terminal.

In an exemplary embodiment, the terminal positions the current geographic location by using a GPS, a BeiDou Navigation Satellite System, or the like.

In 504: Uploading the current geographic location of the terminal to a server.

In an exemplary embodiment, the terminal obtains a latitude and longitude from the current geographic location, and uploads the latitude and longitude to the server.

In 506: Receiving corresponding candidate filter effects and subtitles that are obtained by the server according to the current geographic location of the terminal.

In an exemplary embodiment, the server obtains the corresponding candidate filter effects and subtitles according to the current geographic location of the terminal, and sends the candidate filter effects and subtitles to the terminal.

A mapping relationship between a geographic location and a filter effect and a mapping relationship between a geographic location and a subtitle are pre-established in the server. The geographic location of the terminal is obtained, and one or more corresponding filter effects are found from the mapping relationship between a geographic location and a filter effect according to the geographic location of the terminal, as the candidate filter effects. One or more corresponding subtitles are found from the mapping relationship between a geographic location and a subtitle according to the geographic location of the terminal, as the candidate subtitles. Content of the subtitle may be one or more of a hot event and a historical event at the geographic location.

A filter may be an antimatter filter (implementing brightness inversion without affecting chrominance and saturation), a bevel emboss filter (which can produce a trellised slope and a carving appearance, and covert them into a bevel emboss effect), a corona filter (which can produce a celestial effect such as a corona, an airflow, and a cloud cluster), a cut-out filter (by applying a shadow effect, causing an image to have an effect similar to a cavity or a bump), a drip effect (which can add various vivid drip effects to a text and an image), a fire filter (which can generate various different flames and an effect similar to a flame), a fur filter (which can produce fur and hair of various different shapes and colors and another effect), a glass filter (producing a glass effect by means of simulated refraction, filtering, or reflection), a gradient glow filter (producing a real glow and a gradient color effect around an object), a noise filter (adding different noise effects to an image by adjusting a hue, saturation, and brightness), a jiggle filter (producing a strong distortion and deformation effect), a shadow filter (which can add multiple shadow effects to an object), a smoke filter (which can produce various natural smoke effects), a squint filter (which can produce a blur effect), a star filter (which can produce various star effects), a swirl filter (producing a swirl effect), a water drop filter (which can produce water drop effects of various colors and shapes), a weave filter (producing a weave effect), a wood filter (producing various vivid wood effects), and/or the like.

In 508: Obtaining a filter effect and a subtitle that are selected from the candidate filter effect and subtitle.

In an exemplary embodiment, the candidate filter effects and subtitles are displayed on the terminal, the filter effect selected by a user from the candidate filter effects is obtained, and the subtitle selected by the user from the candidate subtitles is obtained.

In 510: Forming a subtitle beat according to the selected filter effect and subtitle, and output the subtitle beat.

In an exemplary embodiment, for the output subtitle beat, the selected subtitle beat may be displayed in a preview manner, that is, the filter effect and the subtitle are displayed.

In 512: Obtaining an image.

For example, a camera of the terminal is used to photograph the image, or another device is used to photograph the image and then the image is copied to the terminal.

In 514: Adding the subtitle beat to the image.

For example, the subtitle beat is added to the image, so that the image is associated with a hot event or a historical event, which increases information in the image. The image has higher ornamental value by adding the filter effect to the image.

According to the disclosed image processing method, a current geographic location of a terminal is obtained; the current geographic location is uploaded to a server; the server obtains corresponding candidate filter effects and subtitles according to the current geographic location of the terminal, and sends the corresponding candidate filter effects and subtitles to the terminal; and the terminal obtains a filter effect and a subtitle that are selected from the candidate filter effects and subtitles, and forms a subtitle beat.

Because any filter effect and subtitle can be selected from the candidate filter effects and subtitles to form a subtitle beat, the formed subtitle beat is diversified, and the subtitle beat does not need to be stored in the terminal, thereby saving storage space of the terminal. The subtitle beat is further added to an image, which increases information in the image, so that the information in the image is also diversified.

In an exemplary embodiment, step 506 includes: receiving a corresponding combination of a candidate filter effect and subtitle that is obtained by the server according to the current geographic location of the terminal. In an exemplary embodiment, multiple combinations of filter effects and subtitles are provided in the server in advance, to facilitate the user to directly select a combination of a filter effect and a subtitle according to combinations of filter effects and subtitles.

The exemplary step 508 includes: obtaining a combination of a filter effect and a subtitle that is selected from the combinations of a candidate filter effect and subtitle.

The exemplary step 510 includes: forming a subtitle beat according to the selected combination of a filter effect and a subtitle, and outputting the subtitle beat.

In an exemplary embodiment, the step of receiving candidate filter effects and subtitles that are obtained by the server according to the current geographic location of the terminal includes: receiving one or more of a hot event and/or a historical event, obtained by the server from a pre-established mapping relationship between a geographic location and a hot event (and a historical event) according to the current geographic location of the terminal, and using the one or more of the hot event and/or the historical event as the candidate subtitles corresponding to the current geographic location of the terminal.

In an exemplary embodiment, the mapping relationship between a geographic location and a hot event may be pre-established, and the mapping relationship between a geographic location and a historical event may be pre-established. A hot event is an event currently more concerned and interested by people.

By using a hot event or a historical event as a subtitle, on a trip, the user can photograph an image with sharable value based on a current hot event or a historical event.

In an exemplary embodiment, the image processing method further includes: when the server does not obtain the corresponding candidate filter effects and subtitles according to the current geographic location of the terminal, receiving a default filter effect and subtitle that are obtained by the server according to the current geographic location of the terminal; and forming the subtitle beat according to the default filter effect and subtitle.

In an exemplary embodiment, the image processing method further includes: obtaining the selected filter effect and subtitle, and uploading the selected filter effect and subtitle, so that the server counts the usage count of filter effects and the usage count of subtitles, sorts the filter effects according to the usage count thereof, and sorts the subtitles according to the usage count thereof; and receiving the corresponding candidate filter effects obtained and sorted based on the usage count thereof, and the corresponding candidate subtitles obtained and sorted based on the usage count thereof. The candidate filter effects and subtitles are obtained by the server according to the current geographic location of the terminal.

For example, the filter effects are sorted in descending order or in ascending order according to the numbers of times that the filter effects are used.

The filter effects are sorted, and a filter effect that is most frequently used may be recommended to the user, to facilitate selection by the user. The subtitles are sorted, and a subtitle that is most frequently used may be recommended to the user, to facilitate selection of a subtitle by the user.

In an exemplary embodiment, the image processing method further includes: obtaining a subtitle edited by a user and a filter effect selected by the user, and forming a subtitle beat according to the subtitle edited by the user and the filter effect selected by the user.

The subtitle edited by the user is obtained, so that a personalized subtitle can be formed, to form a personalized subtitle beat.

Figure 6:
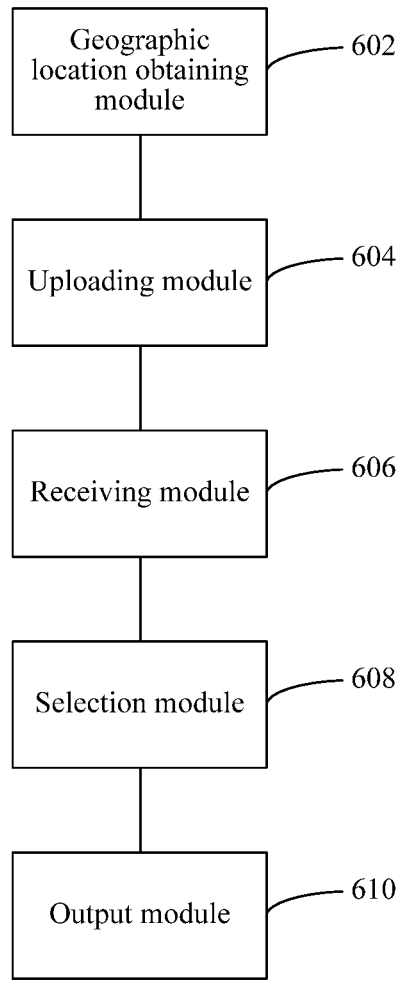
FIG. 6 is a structural block diagram of a subtitle beat generation apparatus according to an exemplary embodiment of the present disclosure.

FIG. 6 is a structural block diagram of a subtitle beat generation apparatus according to an exemplary embodiment of the present disclosure. As shown in FIG. 6, the subtitle beat generation apparatus is run on a terminal, and includes a geographic location obtaining module 602, an uploading module 604, a receiving module 606, a selection module 608, and an output module 610.

The geographic location obtaining module 602 is configured to obtain a current geographic location of the terminal.

The uploading module 604 is configured to upload the current geographic location of the terminal to a server.

In an exemplary embodiment, the terminal obtains a latitude and longitude from the current geographic location, and uploads the latitude and longitude to the server.

The receiving module 606 is configured to receive candidate filter effects and subtitles that are obtained by the server according to the current geographic location of the terminal.

In an exemplary embodiment, the server obtains the corresponding candidate filter effects and subtitles according to the current geographic location of the terminal, and sends the candidate filter effects and subtitles to the terminal.

A mapping relationship between a geographic location and a filter effect and a mapping relationship between a geographic location and a subtitle are pre-established in the server. The geographic location of the terminal is obtained, and one or more corresponding filter effects are found from the mapping relationship between a geographic location and a filter effect according to the geographic location of the terminal, as the candidate filter effects. One or more corresponding subtitles are found from the mapping relationship between a geographic location and a subtitle according to the geographic location of the terminal, as the candidate subtitles. Content of the subtitle may be one or more of a hot event and a historical event at the geographic location.

The selection module 608 is configured to obtain a filter effect and a subtitle, that are selected from the candidate filter effects and subtitles.

The output module 610 is configured to form a subtitle beat according to the selected filter effect and subtitle, and output the subtitle beat.

The disclosed subtitle generation apparatus obtains a current geographic location of a terminal, and uploads the current geographic location to a server; the server obtains one or more corresponding candidate filter effects and subtitles according to the current geographic location of the terminal, and sends the corresponding candidate filter effects and subtitles to the terminal; and the terminal obtains a filter effect and a subtitle that are selected from the candidate filter effects and subtitles, and forms a subtitle beat. Because any filter effect and subtitle can be selected from the candidate filter effects and subtitles to form a subtitle beat, the formed subtitle beat is diversified, and the subtitle beat does not need to be stored in the terminal, thereby saving storage space of the terminal.

In an exemplary embodiment, the receiving module 606 is further configured to: receive one or more of a hot event and a historical event, obtained by the server from a pre-established mapping relationship between a geographic location and a hot event (and a historical event) according to the current geographic location of the terminal, and use the one or more of the hot event and/or the historical event as the candidate subtitles corresponding to the current geographic location of the terminal.

In an exemplary embodiment, the mapping relationship between a geographic location and a hot event is pre-established, and the mapping relationship between a geographic location and a historical event is established. A hot event is an event currently more concerned and interested by people.

By using a hot event or a historical event as a subtitle, on a trip, the user can photograph an image with sharable value based on a current hot event or a historical event.

The receiving module 606 is further configured to: when the server does not obtain or is otherwise unable to obtain, the corresponding candidate filter effects and subtitles according to the current geographic location of the terminal, receive a default filter effect and subtitle that are obtained by the server according to the current geographic location of the terminal; and form a subtitle beat according to the default filter effect and subtitle.

In an exemplary embodiment, the uploading module 604 is further configured to: obtain the selected filter effect and subtitle, and upload the selected filter effect and subtitle, so that the server counts the usage count of filter effects and the usage count of subtitles, sorts the filter effects according to the usage count thereof, and sorts the subtitles according to the usage count thereof.

The receiving module 606 is further configured to: receive the corresponding candidate filter effects obtained and sorted based on a usage count thereof, and receive the corresponding candidate subtitles obtained and sorted based on the usage count thereof. The corresponding candidate filter effects and subtitles are obtained by the server according to the current geographic location of the terminal.

For example, the filter effects are sorted in descending order or in ascending order according to the numbers of times that the filter effects are used.

In an exemplary embodiment, the subtitle beat generation apparatus further includes an input module. The input module obtains a subtitle edited by a user, and forms a subtitle beat according to the subtitle edited by the user and a filter effect selected by the user.

The subtitle edited by the user is obtained, so that a personalized subtitle can be formed, to form a personalized subtitle beat.

Figure 7:
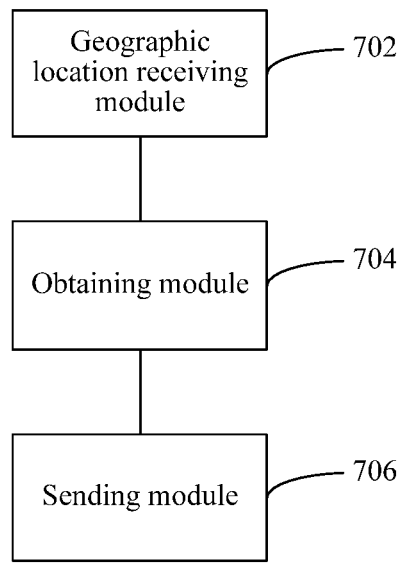
FIG. 7 is a structural block diagram of a subtitle beat generation apparatus according to another exemplary embodiment of the present disclosure.

FIG. 7 is a structural block diagram of a subtitle beat generation apparatus according to another exemplary embodiment of the present disclosure. As shown in FIG. 7, the subtitle beat generation apparatus includes a geographic location receiving module 702, an obtaining module 704, and a sending module 706.

The geographic location receiving module 702 is configured to receive a current geographic location of a terminal.

The obtaining module 704 is configured to obtain corresponding candidate filter effects and subtitles according to the current geographic location of the terminal.

The sending module 706 is configured to send the candidate filter effects and the candidate subtitles to the terminal, so that the terminal obtains a filter effect and a subtitle that are selected from the candidate filter effects and subtitles, and outputs the selected filter effect and subtitle.

The disclosed subtitle beat generation apparatus obtains a current geographic location of a terminal, and obtains a corresponding filter effect and subtitle according to the current geographic location of the terminal and sends the corresponding filter effect and subtitle to the terminal, so that the terminal obtains a filter effect and a subtitle that are selected from the candidate filter effects and subtitles, and forms a subtitle beat. Because any filter effect and subtitle can be selected from the candidate filter effects and subtitles to form the subtitle beat, the formed subtitle beat is diversified, and the subtitle beat does not need to be stored in the terminal, thereby saving storage space of the terminal.

Figure 8:
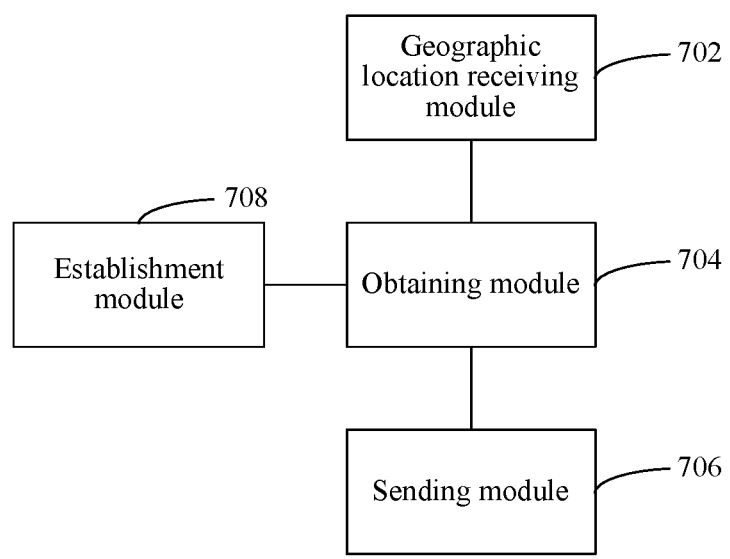
FIG. 8 is a structural block diagram of a subtitle beat generation apparatus according to another exemplary embodiment of the present disclosure.

FIG. 8 is a structural block diagram of a subtitle beat generation apparatus according to another exemplary embodiment of the present disclosure. As shown in FIG. 8, in addition to including the geographic location receiving module 702, the obtaining module 704, and the sending module 706, the subtitle beat generation apparatus further includes an establishment module 708.

The obtaining module 704 obtains the geographic location and a corresponding hot event and/or historical event.

The establishment module 708 is configured to establish a mapping relationship between a geographic location and a hot event (and/or a historical event).

The obtaining module 704 is further configured to: obtain one or more of a hot event and/or a historical event from the mapping relationship between a geographic location and a hot event along with a historical event according to the current geographic location of the terminal, and use the one or more of hot event and/or the historical event as the candidate subtitles corresponding to the current geographic location of the terminal.

In an exemplary embodiment, the sending module 706 is further configured to: when the corresponding candidate filter effects and subtitles are not obtained or otherwise unable to obtain according to the current geographic location of the terminal, obtain a default filter effect and a default subtitle according to the current geographic location of the terminal; and send the default filter effect and subtitle to the terminal.

Figure 9:
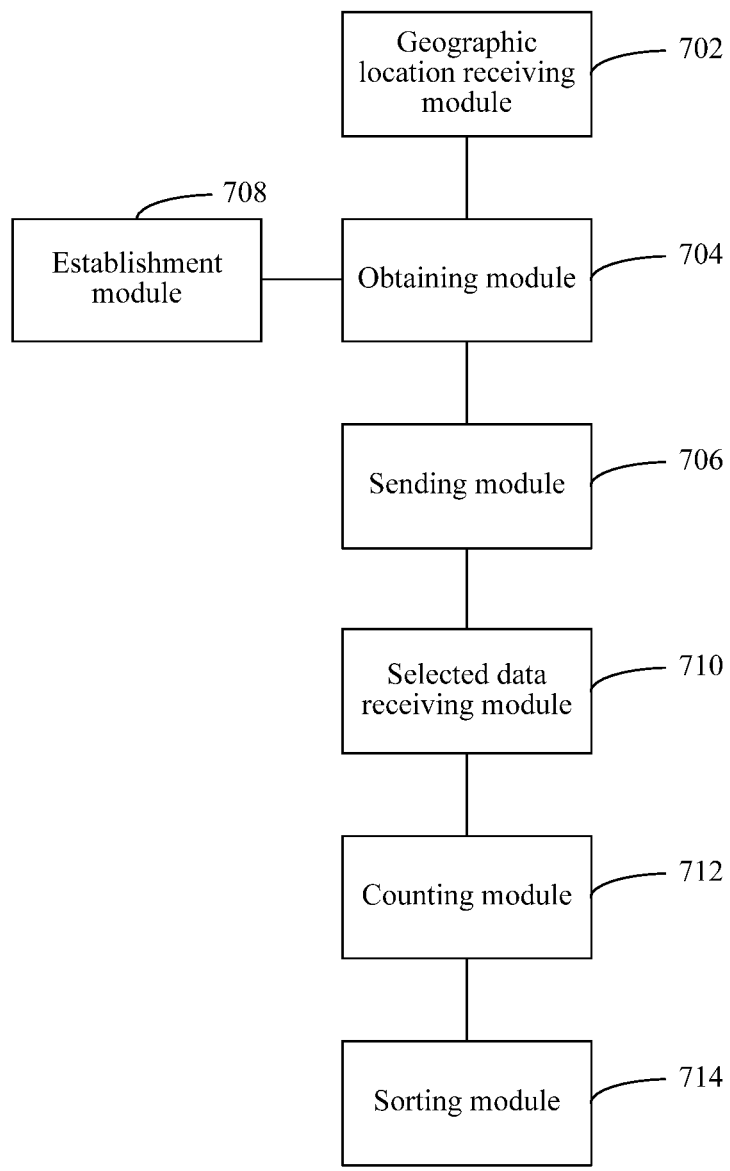
FIG. 9 is a structural block diagram of a subtitle beat generation apparatus according to another exemplary embodiment.

FIG. 9 is a structural block diagram of a subtitle beat generation apparatus according to another exemplary embodiment of the present disclosure. As shown in FIG. 9, in addition to including the geographic location receiving module 702, the obtaining module 704, the sending module 706, and the establishment module 708, the subtitle beat generation apparatus further includes a selected data receiving module 710, a counting module 712, and a sorting module 714.

The selected data receiving module 710 is configured to receive the selected filter effect and subtitle that are uploaded by the terminal.

The counting module 712 is configured to count the usage counts of the filter effects and the subtitles, e.g., the numbers of times that filter effects are used and the numbers of times that subtitles are used.

The sorting module 714 is configured to: sort the filter effects according to the numbers of times that the filter effects are used, and sort the subtitles according to the numbers of times that the subtitles are used.

Figure 10:
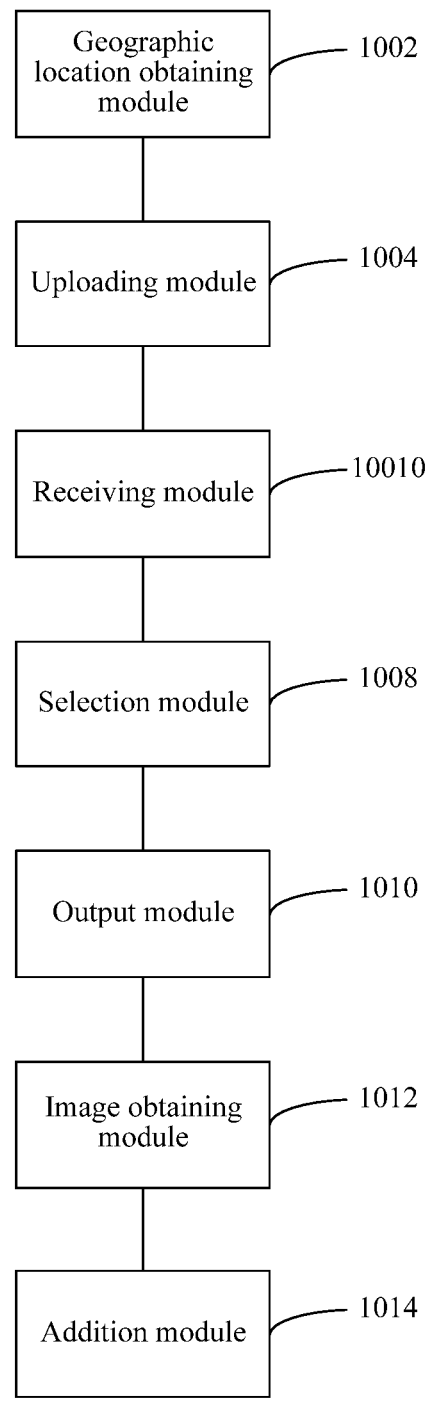
FIG. 10 is a structural block diagram of an image processing apparatus according to an exemplary embodiment of the present disclosure.

FIG. 10 is a structural block diagram of an image processing apparatus according to an exemplary embodiment of the present disclosure. As shown in FIG. 10, the image processing apparatus includes a geographic location obtaining module 1002, an uploading module 1004, a receiving module 1006, a selection module 1008, an output module 1010, an image obtaining module 1012, and an addition module 1014.

The geographic location obtaining module 1002 is configured to obtain a current geographic location of a terminal.

In an exemplary embodiment, the terminal positions the current geographic location by using a GPS, a BeiDou Navigation Satellite System, or the like.

The uploading module 1004 is configured to upload the current geographic location of the terminal to a server.

In an exemplary embodiment, the terminal obtains a latitude and longitude from the current geographic location, and uploads the latitude and longitude to the server.

The receiving module 1006 receives corresponding candidate filter effects and corresponding candidate subtitles, obtained by the server according to the current geographic location of the terminal.

In an exemplary embodiment, the server obtains the corresponding candidate filter effects and the corresponding candidate subtitles, according to the current geographic location of the terminal, and sends the corresponding candidate filter effects and subtitles to the terminal.

A mapping relationship between a geographic location and a filter effect and a mapping relationship between a geographic location and a subtitle are pre-established in the server. The geographic location of the terminal is obtained, and one or more corresponding filter effects are found from the mapping relationship between a geographic location and a filter effect according to the geographic location of the terminal, as the candidate filter effects. One or more corresponding subtitles are found from the mapping relationship between a geographic location and a subtitle according to the geographic location of the terminal, as the candidate subtitles. Content of the subtitle may be one or more of a hot event and a historical event at the geographic location.

The selection module 1008 is configured to obtain a filter effect and a subtitle that are selected from the candidate filter effects and subtitles.

In an exemplary embodiment, the candidate filter effects and subtitles are displayed on the terminal, the filter effect selected by a user from the candidate filter effects is obtained, and the subtitle selected by the user from the candidate subtitles is obtained.

The output module 1010 is configured to form a subtitle beat according to the selected filter effect and subtitle, and output the subtitle beat.

In an exemplary embodiment, for the output subtitle beat, the selected subtitle beat may be displayed in a preview manner, that is, the filter effect and the subtitle are displayed.

The image obtaining module 1012 is configured to obtain an image.

For example, a camera of the terminal is used to photograph the image, or another device is used to photograph the image and then the image is copied to the terminal.

The addition module 1014 is configured to add the selected filter effect and subtitle to the image.

For example, the subtitle beat is added to the image, so that the image is associated with a hot event or a historical event, which increases information in the image.

The disclosed image processing apparatus obtains a current geographic location of a terminal, and uploads the current geographic location to a server; the server obtains corresponding candidate filter effects and subtitles according to the current geographic location of the terminal, and sends the corresponding candidate filter effects and subtitles to the terminal; and the terminal obtains a filter effect and a subtitle, that are selected from the candidate filter effects and subtitles, and forms a subtitle beat from the candidate filter effects and subtitles. Because any filter effect and subtitle can be selected from the candidate filter effects and subtitles to form a subtitle beat, the formed subtitle beat is diversified, and the subtitle beat does not need to be stored in the terminal, thereby saving storage space of the terminal. The subtitle beat is added to an image, which increases information in the image, so that the information in the image is also diversified.

According to the disclosed subtitle beat generation method and the disclosed terminal, a current geographic location of the terminal is obtained; the current geographic location is uploaded to a server; the server obtains candidate filter effects and subtitles according to the current geographic location of the terminal, and sends the candidate filter effects and the candidate subtitles to the terminal; and the terminal obtains a filter effect and a subtitle that are selected from the candidate filter effects and subtitles, and forms a subtitle beat. Because any filter effect and subtitle can be selected from the candidate filter effects and subtitles to form a subtitle beat, the formed subtitle beat is diversified, and the subtitle beat does not need to be stored in the terminal, thereby saving storage space of the terminal.

According to the disclosed subtitle beat generation method and the disclosed server, a current geographic location of a terminal is obtained; and candidate filter effects and candidate subtitles are obtained according to the current geographic location of the terminal and are sent to the terminal, so that the terminal obtains a filter effect and a subtitle that are selected from the candidate filter effects and the candidate subtitles, and forms a subtitle beat. Because any filter effect and subtitle can be selected from the candidate filter effects and the candidate subtitles to form a subtitle beat, the formed subtitle beat is diversified, and the subtitle beat does not need to be stored in the terminal, thereby saving storage space of the terminal.

A person of ordinary skill in the art may understand that all or some of the processes of the methods in the disclosed embodiments may be implemented by a computer program instructing relevant hardware. The program may be stored in a non-volatile computer-readable storage medium. When the program runs, the processes of the disclosed methods in the embodiments are performed. The storage medium may be a magnetic disc, an optical disc, a read-only memory (ROM), or the like.

The disclosed embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A subtitle beat generation method, comprising:
   obtaining a geographic location of a terminal;
   uploading the geographic location of the terminal to a server;
   generating candidate filter effects and candidate subtitles by the server according to the geographic location of the terminal;
   generating, by the server, sorted candidate filter effects and sorted candidate subtitles, according to a usage count of the filter effects and a usage effect of the subtitles;
   obtaining a filter effect and a subtitle, selected from the sorted candidate filter effects and the sorted candidate subtitles;
   uploading the filter effect and the subtitle;
   forming a subtitle beat according to the filter effect and the subtitle; and
   outputting the subtitle beat.

2. The method according to claim 1, wherein generating candidate filter effects and candidate subtitles by the server according to the geographic location of the terminal includes:
   receiving one or more of a hot event and a historical event provided by the server from a pre-established mapping relationship among geographic locations, hot events, and historical events according to the geographic location of the terminal; and
   using the one or more of the hot event and the historical event as the candidate subtitles corresponding to the geographic location of the terminal.

3. The method according to claim 1, further comprising:
   when the server is unable to obtain the corresponding candidate filter effects and candidate subtitles according to the current geographic location of the terminal, receiving a default filter effect and a default subtitle that are provided by the server according to the geographic location of the terminal.

4. The method according to claim 1, further comprising:
   editing, by a user, the subtitle to form an edited subtitle; and
   forming the subtitle beat according to the edited subtitle and the filter effect.

5. The method according to claim 1, further comprising:
   adding the subtitle beat to an image.

6. The method according to claim 1, wherein generating candidate filter effects and candidate subtitles by the server according to the geographic location of the terminal includes:
   performing at least one of:
      receiving a hot event provided by the server from a pre-established mapping relationship between geographic locations and hot events; and
      receiving a historical event provided by the server from a pre-established mapping relationship between geographic locations and historical events; and
   using at least one of the hot event and the historical event as the candidate subtitles.

7. A terminal, comprising: a memory, configured to store computer-readable instructions; and a processor, coupled to the memory and when the computer-readable instructions are executed, configured to:
   obtain a geographic location of the terminal;
   upload the geographic location of the terminal to a server;
   receive candidate filter effects and candidate subtitles from the server according to the geographic location of the terminal;
   receive, from the server, sorted candidate filter effects and sorted candidate subtitles generated according to a usage count of the candidate filter effects and a usage effect of the candidate subtitles;
   obtain a filter effect and a subtitle, selected from the sorted candidate filter effects and the sorted candidate subtitles;
   upload the filter effect and the subtitle; and
   receive, from the server, a subtitle beat formed according to the filter effect and the subtitle.

8. The terminal according to claim 7, wherein the processor is further configured to:
   receive one or more of a hot event and a historical event provided by the server from a pre-established mapping relationship among geographic locations, hot events, and historical events according to the geographic location of the terminal; and
   use the one or more of the hot event and the historical event as the candidate subtitles corresponding to the geographic location of the terminal.

9. The terminal according to claim 7, wherein the processor is further configured to:
   when the server is unable to obtain the candidate filter effects and candidate subtitles according to the geographic location of the terminal, receive a default filter effect and a default subtitle that are provided by the server according to the geographic location of the terminal.

10. The terminal according to claim 7, wherein the processor is further configured to:
    obtain an edited subtitle formed by a user's editing of the subtitle; and
    form the subtitle beat according to the edited subtitle and the filter effect.

11. The terminal according to claim 7, wherein the processor is further configured to:
    add the subtitle beat to an image.

12. The terminal according to claim 7, wherein the processor is further configured to:
    perform at least one of:
       receiving a hot event provided by the server from a pre-established mapping relationship between geographic locations and hot events; and
       receiving a historical event provided by the server from a pre-established mapping relationship between geographic locations and historical events; and
    use at least one of the hot event and the historical event as the candidate subtitles.

13. A non-transitory computer-readable storage medium containing computer-executable program instructions for a processor to:
- obtain a geographic location of a terminal;
- upload the geographic location of the terminal to a server;
- receive candidate filter effects and candidate subtitles from the server according to the geographic location of the terminal;
- receiving sorted candidate filter effects and sorted candidate subtitles generated by the server according to a usage count of the candidate filter effects and a usage effect of the candidate subtitles;
- obtain a filter effect and a subtitle, selected from the sorted candidate filter effects and the sorted candidate subtitles; and
- receive a subtitle beat generated by the server according to the filter effect and the subtitle.

14. The storage medium according to claim 13, wherein the processor is further configured to:
- receive one or more of a hot event and a historical event provided by the server from a pre-established mapping relationship among geographic locations, hot events, and historical events according to the geographic location of the terminal; and
- using the one or more of the hot event and the historical event as the candidate subtitles corresponding to the geographic location of the terminal.

15. The storage medium according to claim 13, wherein the processor is further configured to:
- when the server is unable to obtain the candidate filter effects and candidate subtitles according to the geographic location of the terminal, receive a default filter effect and a default subtitle that are provided by the server according to the geographic location of the terminal.

16. The storage medium according to claim 13, wherein the processor is further configured to:
- obtain an edited subtitle generated by a user's editing of the subtitle; and
- form the subtitle beat according to the edited subtitle edited by the user and the filter effect.

17. The non-transitory computer-readable storage medium according to claim 13, wherein the processor is further configured to:
- perform at least one of:
  - receiving a hot event provided by the server from a pre-established mapping relationship between geographic locations and hot events; and
  - receiving a historical event provided by the server from a pre-established mapping relationship between geographic locations and historical events; and
- use at least one of the hot event and the historical event as the candidate subtitles.

* * * * *